United States Patent [19]
DeDoncker et al.

[11] Patent Number: 5,172,309
[45] Date of Patent: Dec. 15, 1992

[54] AUXILIARY QUASI-RESONANT DC LINK CONVERTER

[75] Inventors: Rik W. A. A. DeDoncker, Schenectady; James P. Lyons, Niskayuna, both of N.Y.

[73] Assignee: General Electric Company, Schenectady, N.Y.

[21] Appl. No.: 741,873

[22] Filed: Aug. 7, 1991

[51] Int. Cl.$^5$ .................. H02M 5/458; H02M 7/5387
[52] U.S. Cl. ...................................... 363/132; 363/37; 363/138
[58] Field of Search ...................... 363/35, 37, 51, 135, 363/136, 137, 138, 132

[56] References Cited

U.S. PATENT DOCUMENTS

| | | | |
|---|---|---|---|
| 4,730,242 | 3/1988 | Divan | 363/37 |
| 4,864,483 | 9/1989 | Divan | 363/37 |
| 4,965,709 | 10/1990 | Ngo | 363/37 |
| 5,038,267 | 8/1991 | DeDoncker et al. | 363/37 X |
| 5,047,913 | 9/1991 | DeDoncker et al. | 363/138 X |

*Primary Examiner*—Emanuel T. Voeltz
*Attorney, Agent, or Firm*—Jill M. Breedlove; Marvin Snyder

[57] ABSTRACT

An auxiliary quasi-resonant dc link (AQRDCL) converter is employed to achieve soft-switching in an inverter coupled to a dc supply via a resonant dc link circuit. The resonant dc link circuit generates a quasi-resonant voltage to the inverter via a resonant bus. The dc link circuit includes upper and lower capacitors coupled to series between the positive and negative rails of the dc supply, respectively, with the voltage across the lower capacitor being controlled to be greater than the voltage across the upper capacitor. In this way, the need for a switch shorting the resonant bus to ground during a resonant cycle is avoided. An auxiliary switching device assists resonant operation of the resonant bus to zero voltage in order to provide a zero-voltage switching opportunity for the inverter switching devices as the inverter changes state. The AQRDCL then quickly resonates back up to the positive rail voltage as a clamping circuit clamps the resonant bus voltage thereto either with or without the assistance of a second auxiliary switching device, as desired. The auxiliary switching device(es) operates under zero-current switching conditions and at a rate that is below the resonant frequency of the resonant dc link circuit. In addition to high efficiency, the AQRDCL converter has low current and voltage stresses and uses a minimal number of circuit components. The AQRDCL may be used to achieve soft-switching in a variety of inverter topologies, including a switched reluctance machine inverter.

15 Claims, 10 Drawing Sheets

AUXILIARY QUASI-RESONANT DC LINK CONVERTER

FIELD OF THE INVENTION

The present invention relates generally to soft-switching converters and, more particularly, to a quasi-resonant dc link converter employing an auxiliary resonant commutation circuit with a minimal number of devices.

BACKGROUND OF THE INVENTION

To overcome the problem of active device switching losses in power converters, while enabling operation at higher switching frequencies, soft-switching converters have been developed. For example, D. M. Divan describes an active-clamped resonant dc link (ACRDCL) converter in U.S. Pat. No. 4,864,483, issued Sept. 5, 1989, which is incorporated by reference herein. In the ACRDCL, a resonant circuit, comprising a resonant inductance and a resonant capacitance, is connected to a dc power supply and to a resonant dc bus supplying an inverter. Stable high-frequency oscillations of the resonant circuit provide a unidirectional voltage across the resonant dc bus which reaches zero voltage during each resonant cycle. The inverter switching devices are controlled to switch on and off only at times when the dc bus voltage is zero, thereby substantially avoiding switching losses in the inverter. Despite its advantages, the ACRDCL converter has the following disadvantages: (1) The clamp switch is required to operate at the resonant frequency of the resonant circuit, which can lead to significant switching losses; (2) Inverter switches are subject to high voltage stresses above the dc power supply voltage; and (3) The converter must maintain continuous resonant operation on the dc link.

An alternative soft-switching converter is an auxiliary resonant commutated pole (ARCP) converter which employs an auxiliary resonant snubber for each inverter phase, which snubber is triggered by auxiliary switching devices to achieve zero-voltage switching in the inverter main devices. According to the ARCP control described in commonly assigned U.S. Pat. No. 5,047,913 of R. W. De Doncker and J. P. Lyons, issued Sept. 10, 1991 and incorporated by reference herein, the auxiliary resonant commutation circuit is triggered into conduction by gating one of the auxiliary power switches which connect the auxiliary resonant circuit to a forcing potential of half the dc link voltage. The auxiliary resonant circuit produces a sinusoidal half-cycle of current which results in the resonant bus voltage swinging between the positive and negative rails of the dc link. After this half cycle is completed, the auxiliary device turns off. Thus, the auxiliary switches are required to conduct only when the main devices are in the process of switching, and they naturally turn off at zero current as the resonant cycle seeks to reverse direction. Advantageously, in contrast to the ACRDCL converter described hereinabove, the ACRP converter is not required to resonate continuously. However, the ARCP circuit requires auxiliary devices and resonant inductors for each phase leg of the inverter. Furthermore, in converters for switched reluctance machines (SRM's), the number of auxiliary resonant commutation circuits required can even be twice the number of motor phases because the SRM inverter has no common connection point for the upper and lower switching devices in a given phase leg.

Therefore, it is desirable to provide a quasi-resonant soft-switching converter that has only one auxiliary resonant commutation circuit and is required to provide a soft-switching opportunity only when the inverter switches to another state. To be practical, such a quasi-resonant converter should exhibit low current and voltage stresses and should use a minimal number of circuit components. Moreover, such a quasi-resonant dc link converter should be capable of producing quasi-PWM waveforms, i.e., pulse width modulated waveforms with a minimum dead-time equal to one-half the resonant cycle, thereby eliminating the subharmonics that are otherwise created by the discrete pulse problems associated with the discrete pulse modulation (DPM) scheme of the ACRDCL converter.

SUMMARY OF THE INVENTION

An auxiliary quasi-resonant dc link (AQRDCL) converter includes a resonant dc link circuit coupling an inverter to a dc supply. In one preferred embodiment, the resonant dc link circuit includes an auxiliary resonant commutation circuit comprising a series combination of a resonant inductor and a pair of antiparallel-coupled auxiliary switching devices coupled to the junction between a pair of upper and lower resonant capacitors. The resonant capacitors are coupled in series between the positive and negative rails of the dc supply. In an alternative embodiment, the auxiliary resonant commutation circuit employs a single auxiliary switching device. The inverter is coupled across the lower resonant capacitor which supports the quasi-resonant dc link voltage. The AQRDCL converter further includes first clamping means, comprising a diode in antiparallel with an upper switch, for holding the quasi-resonant dc link voltage to the positive rail voltage level during a resonant cycle. Second clamping means clamp the quasi-resonant dc link voltage to the negative rail voltage level, i.e., zero, during a resonant cycle. First and second dc capacitors are coupled in series between the positive and negative rails of the dc supply, the first capacitor having a terminal coupled to the positive rail, and the second capacitor having a terminal coupled to the negative rail. The voltage across the second capacitor is controlled to be greater than the voltage across the first capacitor.

In operation, the auxiliary resonant commutation circuit assists resonance of the quasi-resonant dc link, or resonant bus, to zero voltage in order to provide a zero-voltage switching opportunity for the inverter switching devices as the inverter changes state. After the inverter changes state, the resonant bus quickly resonates back up to the voltage level of the positive rail of the dc supply. Advantageously, the AQRDCL converter exhibits low current and voltage stresses and uses a minimal number of circuit components. As a further advantage, the auxiliary switching device(s) operates under zero-current switching conditions. Still further, the auxiliary switch(es) and the resonant inductor operate at a rate that is below the resonant frequency of the resonant dc link circuit, thereby increasing efficiency even further.

The AQRDCL topology of the present invention may be employed to achieve soft-switching in a variety of suitable types of inverters. For example, one suitable type of inverter is a typical multiphase inverter having at least one switching device per phase with an antiparallel diode coupled across each respective switching device. As another example, the AQRDCL topology may be employed to achieve soft-switching in a bridge inverter of the type used to drive a switched reluctance motor (SRM).

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
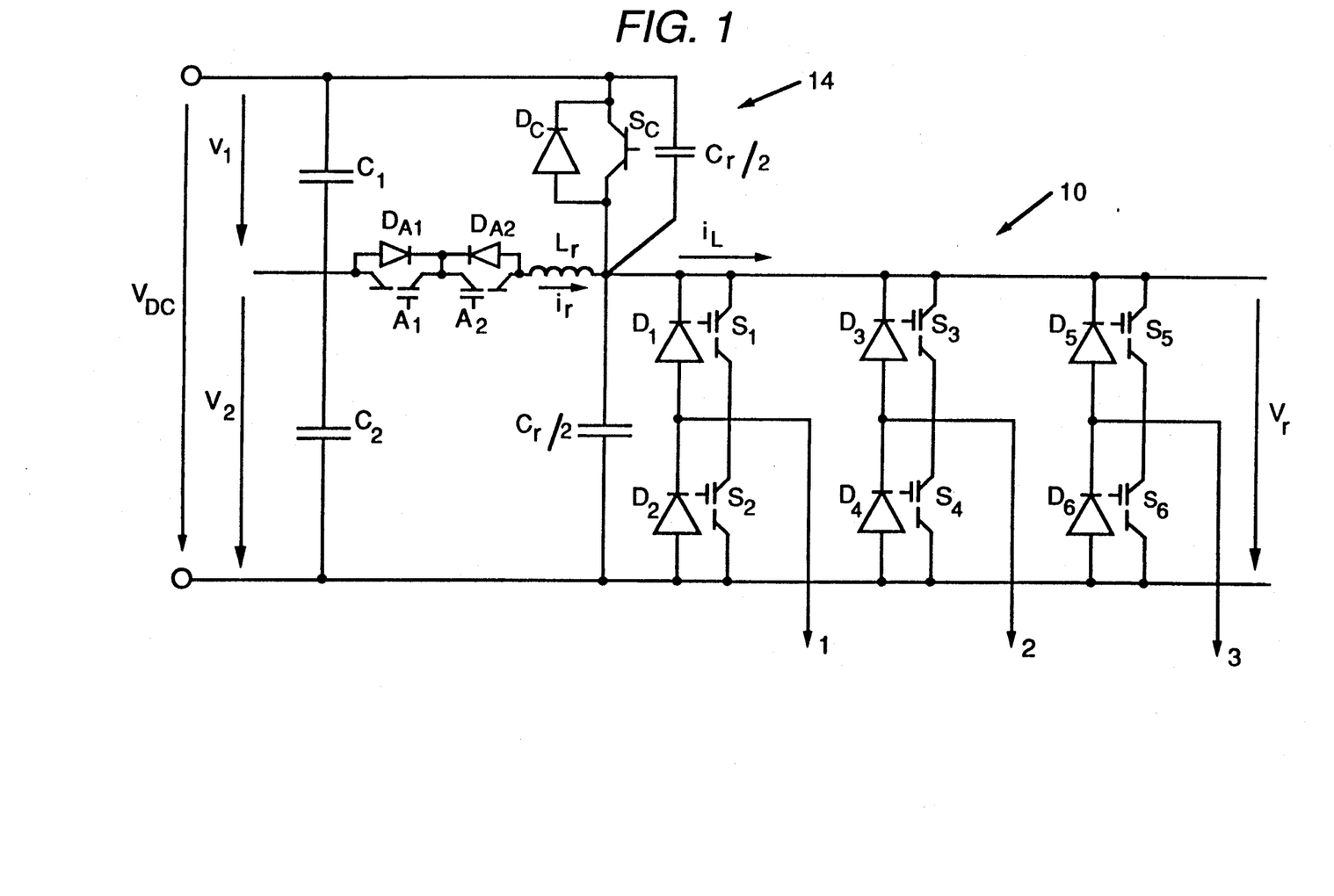
FIG. 1 is a schematic illustration of an auxiliary quasi-resonant dc link converter according to a preferred embodiment of the present invention.

FIG. 1 illustrates an AQRDCL converter according to a preferred embodiment of the present invention. The AQRDCL converter includes a resonant dc link circuit coupling an inverter 10 to a dc supply $V_{dc}$. In the embodiment of FIG. 1, the dc link circuit includes an auxiliary resonant commutation circuit comprising a series combination of a resonant inductor $L_r$ and a pair of antiparallel-coupled auxiliary switching devices $A_1$ and $A_2$ coupled to the junction between a pair of upper and lower resonant capacitors $C_r/2$. The upper and lower resonant capacitors $C_r/2$ are coupled in series between the positive and negative rails of the dc supply $V_{dc}$. The auxiliary switching devices each have an antiparallel diode $D_{A1}$ and $D_{A2}$ respectively coupled thereacross. Inverter 10 is coupled across the lower resonant capacitor. The AQRDCL converter further includes first clamping means 14 coupled to the series combination of the auxiliary devices $A_1$ and $A_2$ and resonant inductor $L_r$ for clamping the quasi-resonant dc link voltage $v_r$ to the positive rail voltage during a resonant cycle. First clamping means 14 comprises a clamp switching device $S_c$ coupled in antiparallel with a clamp diode $D_c$. The AQRDCL converter still further includes second clamping means, described hereinbelow, for clamping the quasi-resonant dc link voltage $v_r$ to zero during a resonant cycle. First and second dc capacitors, $C_1$ and $C_2$, respectively, are coupled in series between the positive and negative rails of the dc supply, the first capacitor $C_1$ having a terminal coupled to the positive rail, and the second capacitor $C_2$ having a terminal coupled to the negative rail. In accordance with the present invention, the voltage $V_2$ across the second capacitor $C_2$ is controlled to be greater than the voltage $V_1$ across the first capacitor $C_1$.

Those of ordinary skill in the art will appreciate that other equivalent resonant capacitor configurations may be used in lieu of capacitors $C_r/2$, described hereinabove, such as, for example, coupling a single resonant capacitor $C_r$ across clamping means 14 or across the auxiliary resonant commutation circuit.

By way of example, inverter 10 is shown in FIG. 1 as comprising a three-phase inverter having two main switching devices per phase, $S_1$-$S_2$, $S_3$-$S_4$ and $S_5$-$S_6$, respectively, and an antiparallel diode $D_1$-$D_2$, $D_3$-$D_4$ and $D_5$-$D_6$, respectively, coupled across each main switching device. However, it is to be understood that the AQRDCL converter of the present invention may be employed to achieve soft-switching in a variety of inverter topologies, such as, for example, a SRM bridge inverter, as described hereinbelow.

Figure 2:
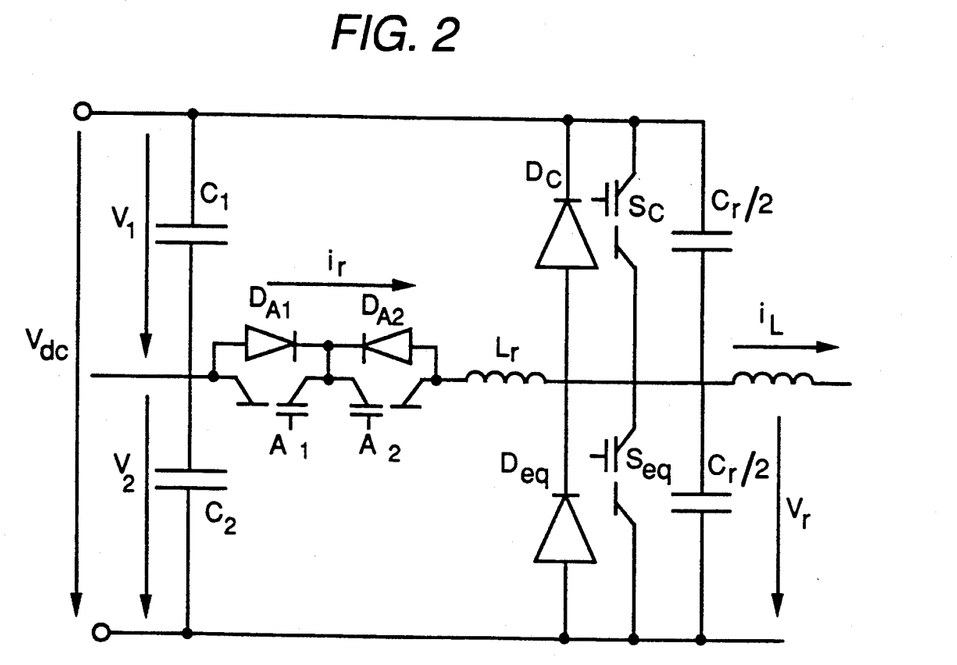
FIG. 2 is a schematic illustration of a circuit equivalent to that of FIG. 1 useful in understanding the operation thereof.

FIG. 2 illustrates a circuit equivalent to the AQRDCL converter of FIG. 1 during resonant operation useful in understanding the operation thereof. In FIG. 2, diode $D_{eq}$ represents the equivalent diode formed by the series combination of diodes $D_1$-$D_2$, $D_3$-$D_4$ and $D_5$-$D_6$, respectively, for each phase. Similarly, switching device $S_{eq}$ represents the equivalent switch formed by the series combination of devices $S_1$-$S_2$, $S_3$-$S_4$ and $S_5$-$S_6$, respectively, for each phase. In the circuit of FIG. 2, diode $D_{eq}$ functions as the second clamping means for clamping the quasi-resonant dc link voltage to zero during a resonant cycle, as mentioned hereinabove. It is to be noted that the equivalent AQRDCL circuit during resonance (FIG. 2) is identical to an ARCP phase leg described hereinabove because the inverter state does not change during resonant bus transitions.

Figure 3A:
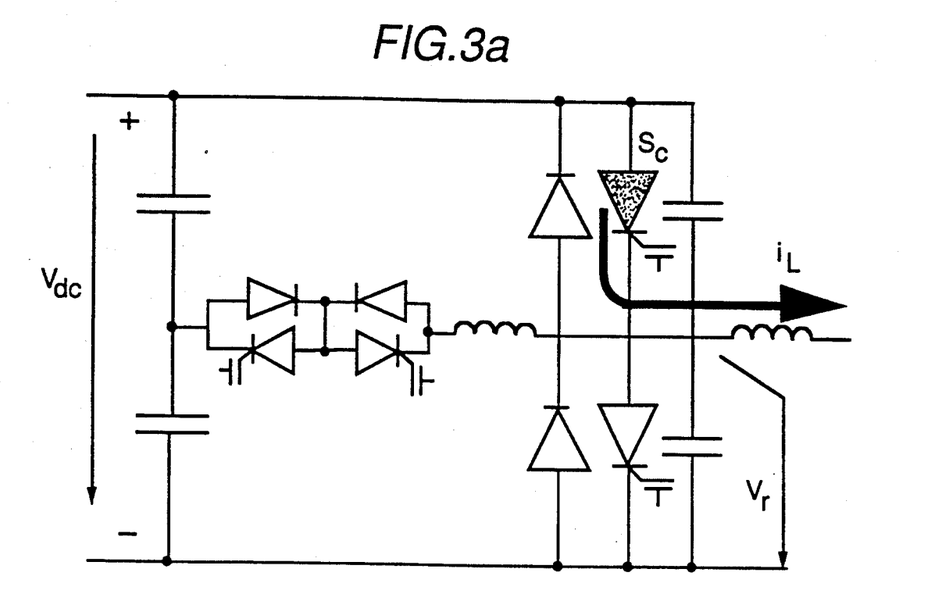
FIGS. 3a-3i schematically illustrate the sequence and directions of current flow in the equivalent circuit of FIG. 2 during a resonant cycle.
Figure 3B:
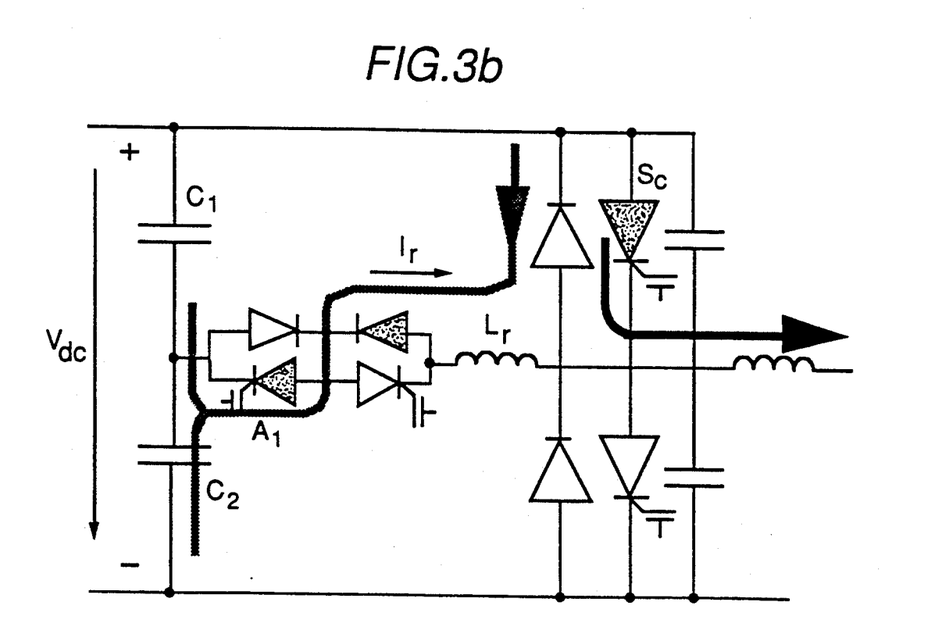
Figure 3C:
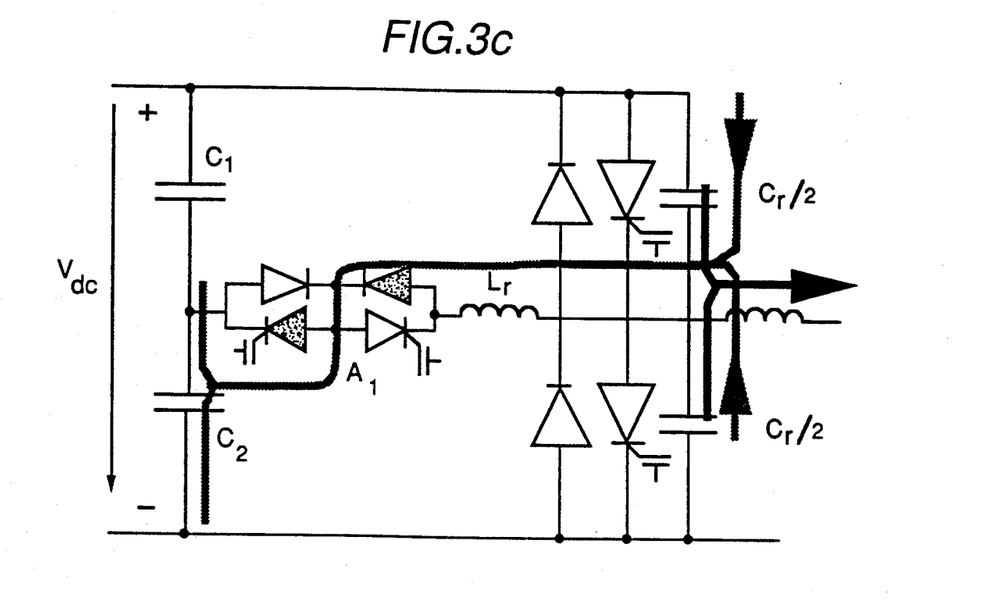
Figure 4:
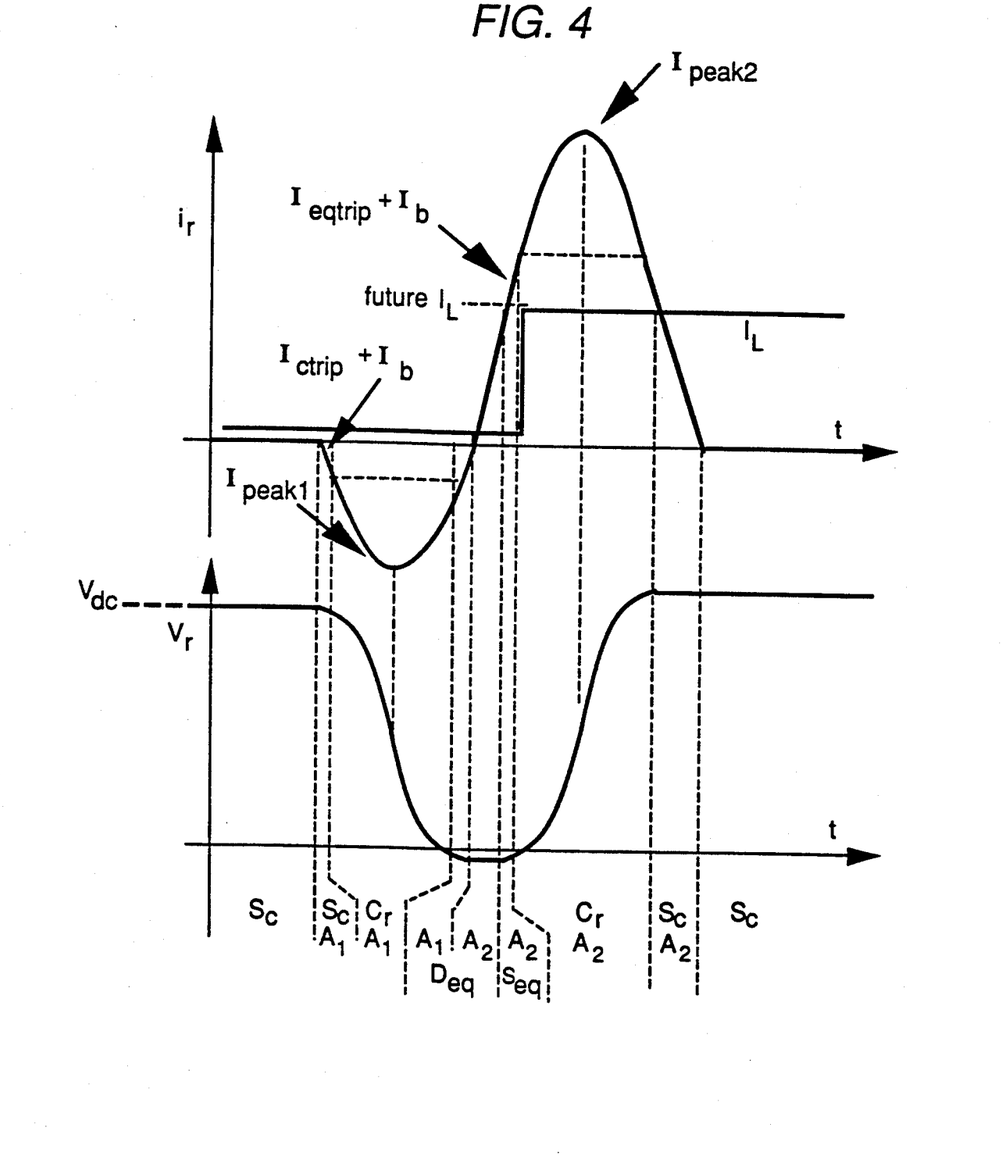
FIG. 4 is a graphical illustration of the resonant inductor current and quasi-resonant dc link voltage corresponding to the commutation sequence of FIGS. 3a-3i.

FIGS. 3a-3i schematically illustrate the switching sequence of the equivalent AQRDCL circuit of FIG. 2. In FIGS. 3a-3i, the arrows indicate the directions of current flow, and the conducting devices are indicated by stippling. In conjunction therewith, FIG. 4 graphically illustrates the resonant inductor current $i_r$, the resonant dc link current $i_L$ and the quasi-resonant dc link voltage $v_r$, also referred to herein as the resonant bus voltage $v_r$. As indicated in FIGS. 3a and 4, the resonant dc link current $i_L$ is initially assumed to be positive, and the clamp switch $S_c$ provides the current path therefor. Clamp switch $S_c$ is turned off for resonant transitions of the resonant bus voltage $v_r$ to the voltage level of the negative rail. At relatively low (and negative) values of the resonant dc link current $i_L$, auxiliary switch $A_1$ is turned on before clamp switch $S_c$ is turned off in order to assist the resonant transition, as indicated in FIG. 3b. In this way, auxiliary switch $A_1$ provides clamp switch So with the minimum trip current $I_{ctrip}$ and some boost current $i_b$ needed to resonate to the negative rail voltage. When the voltage $V_1$ is equal to or greater than the voltage $V_2$ across the second capacitor $C_2$, the minimum trip current that has to flow in clamp switch $S_c$ in order to resonate the bus voltage $v_r$ to the negative rail is substantially zero; only some boost current $I_b$ may be required to cover the resonant losses applied to clamp switch $S_c$ by the auxiliary commutation circuit. When voltage $V_1$ is less than voltage $V_2$, the minimum clamp switch trip current $I_{ctrip}$ needed to ensure that the voltage across the resonant bus reaches zero is represented by:

$$I_{ctrip} \geq \frac{\sqrt{V_2^2 - V_1^2}}{Z_r},$$

where $Z_r$ is the resonant impedance defined as follows:

$$Z_r = \sqrt{\frac{L_r}{C_r}}.$$

Figure 3D:
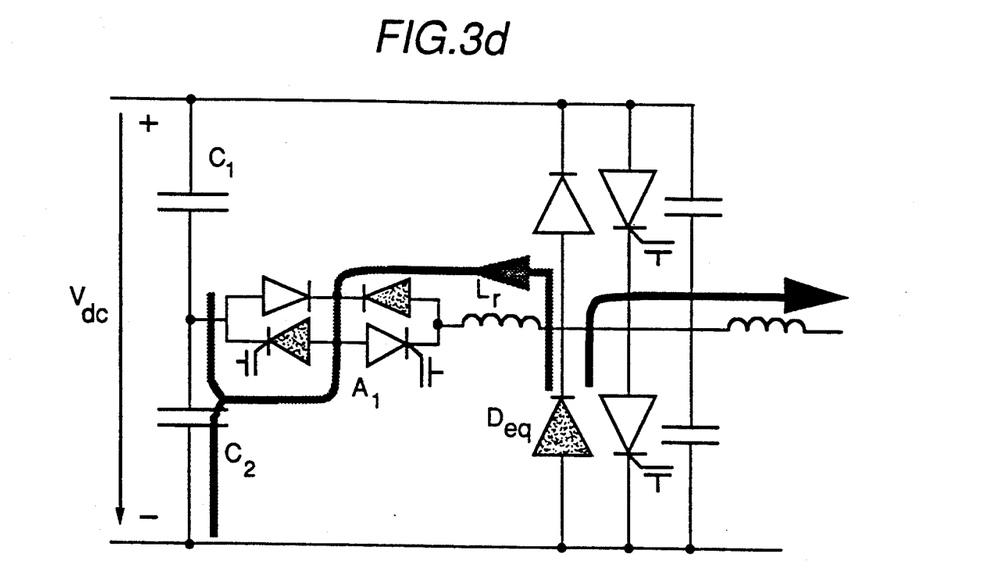

On the other hand, at relatively high resonant link currents $i_L$, the auxiliary device is not activated before clamp switch $S_c$ is turned off in order to avoid high current stress on the clamp switch. For high resonant link currents, a fast transition to the negative dc rail voltage is guaranteed by the high current itself. As illustrated in FIG. 4, the resonant link current $i_L$, assisted by the auxiliary devices (if necessary) forces the resonant bus voltage $v_r$ to swing to the negative rail voltage. When the resonant bus voltage $v_r$ reaches the negative rail voltage level, the equivalent inverter diode $D_{eq}$ becomes forward biased and clamps the resonant bus to zero voltage (FIG. 3d). The peak current $I_{peak1}$ in the auxiliary commutation circuit is given by the expression:

$$I_{peak1} = \sqrt{(I_{ctrip} + I_b)^2 + \left(\frac{V_1}{Z_r}\right)^2}.$$

Figure 3E:
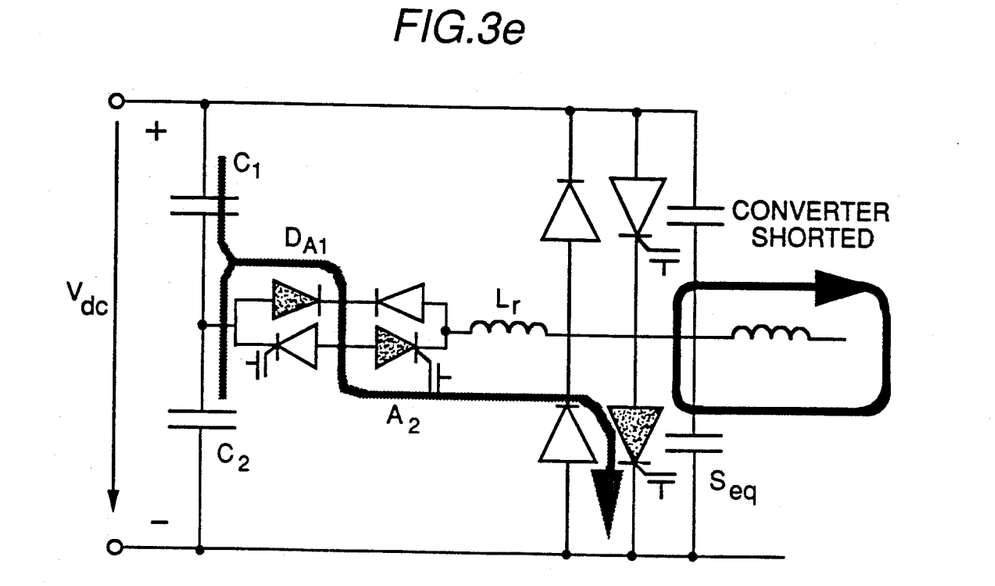

With the resonant bus voltage $v_r$ clamped to zero voltage, the respective inverter switches are turned on, corresponding to equivalent switch $S_{eq}$ in FIG. 3e, shorting the resonant bus. Auxiliary switch $A_2$ is also turned on. At this point, a ramp-up phase beings wherein the resonant inductor current $i_r$ increases at a linear rate of $V_2/L_r$ (FIG. 4). When the resonant inductor current reaches a value corresponding to the future resonant link current $I_L$ plus the required trip current $I_{eqtrip}$ plus the boost current $I_b$, the new inverter state is selected.

When voltage $V_2$ is less than voltage $V_1$, the minimum clamp switch trip current $I_{eqtrip}$ needed to ensure that the voltage across the resonant bus reaches zero is represented by:

$$I_{eqtrip} \geq \frac{\sqrt{V_1^2 - V_2^2}}{Z_r}.$$

Figure 3F:
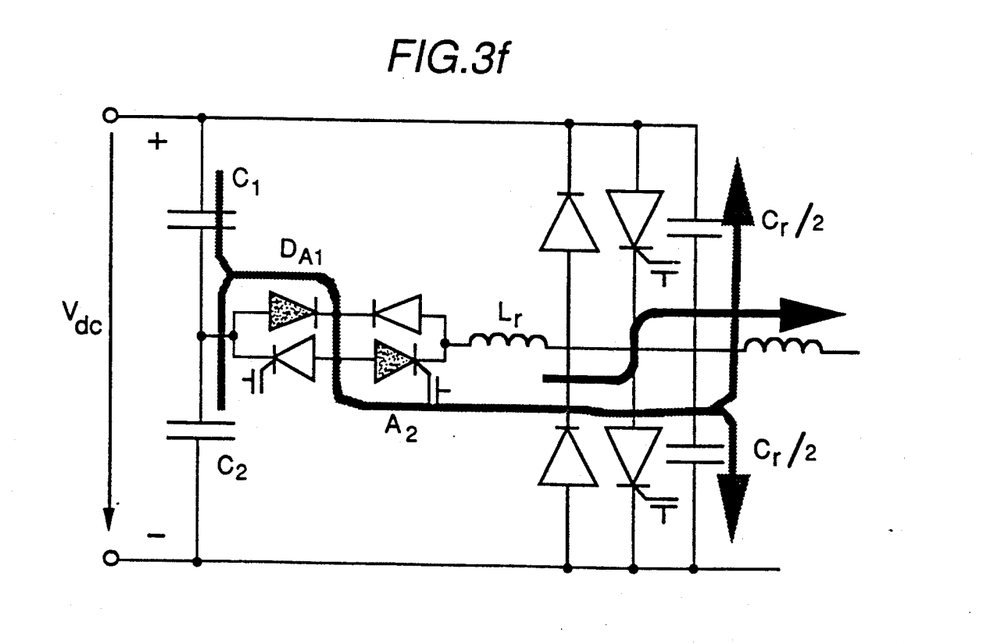

After the inverter changes state, i.e., switch $S_{eq}$ turns off, the resonant bus voltage $v_r$ begins to resonate to the voltage level of the positive rail (FIGS. 3f and 4). During this phase of the resonant cycle, the resonant inductor current $i_r$ is a half-cycle of sinusoidal current superimposed upon the resonant link current $I_L$. The peak current $I_{peak2}$ in the auxiliary commutation circuit is given by the expression:

$$I_{peak2} = I_L + \sqrt{(I_{eqtrip} + I_b)^2 + \left(\frac{V_2}{Z_r}\right)^2}.$$

Figure 3G:
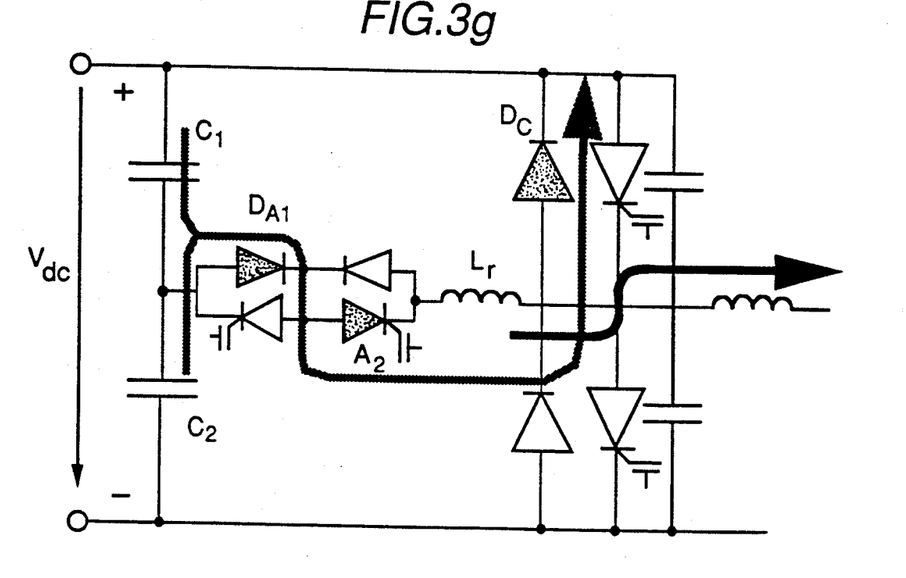
Figure 3H:
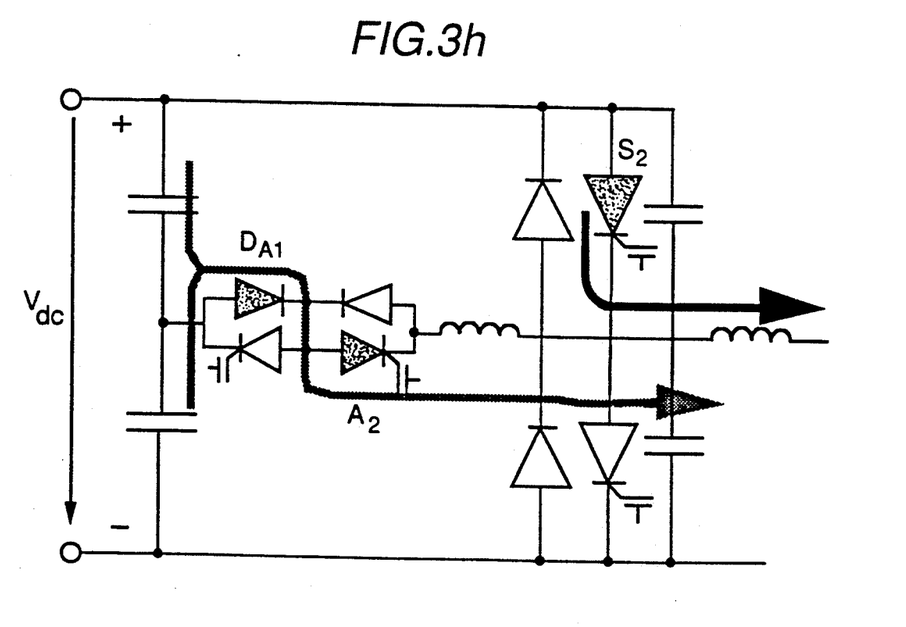
Figure 3I:
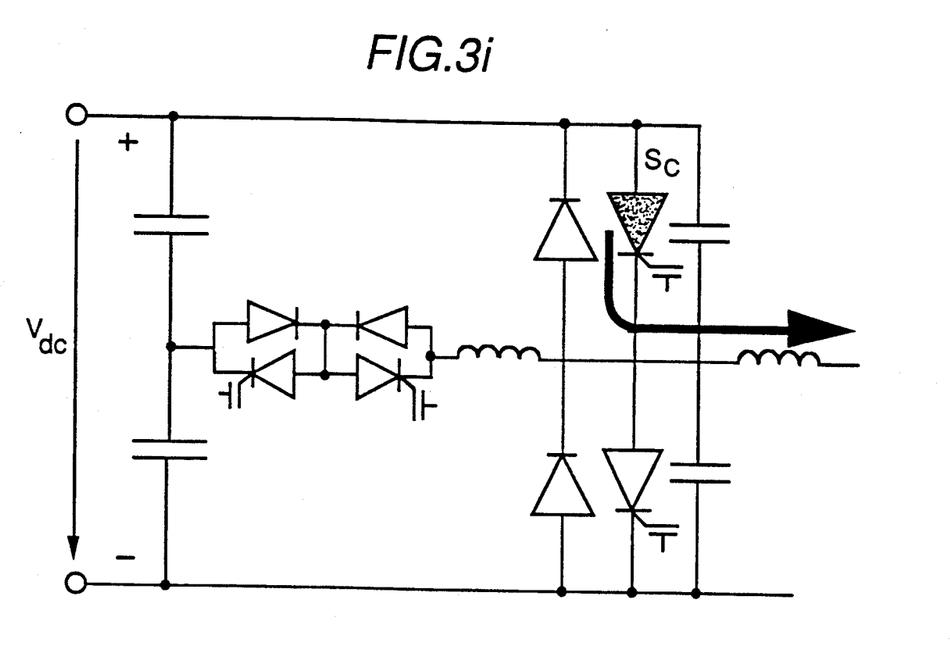

When the resonant bus voltage $v_r$ reaches and attempts to overshoot the positive rail voltage level, clamp diode $D_c$ becomes forward biased and clamps the bus voltage to the positive rail voltage level (FIG. 3g). At this point, clamp switch $S_c$ is turned on with substantially no switching losses (FIG. 3h). Excess boost energy left in resonant inductor $L_r$ is returned to capacitors $C_1$ and $C_2$ as the current $i_r$ therein decreases, forced by the potential $V_2$. When the resonant inductor current $i_r$ falls below the current $I_L$, a ramp-down phase begins wherein the current $i_r$ continues to decrease at a linear rate of $V_1/L_r$. As the current $i_r$ decreases, the link current $i_L$ transfers into the clamp switch $S_c$. The commutation sequence ends when the resonant inductor current $i_r$ reaches zero, and auxiliary switch $A_2$ is turned off (FIG. 3i).

Operation of the AQRDCL converter has been described hereinabove assuming the link current $i_L$ is positive. For negative link currents, however, auxiliary switching device $A_1$ of the auxiliary resonant commutation circuit must be triggered to reverse the current in clamp diode $D_c$. The current in resonant inductor $L_r$ builds linearly, displacing the current in the clamp diode. When the current in the clamp diode reaches zero, the current builds in the clamp switch. Thence, operation proceeds as described hereinabove with reference to FIGS. 3a-3i for low resonant dc link currents; i.e., a minimum clamp switch trip current is needed.

Figure 5:
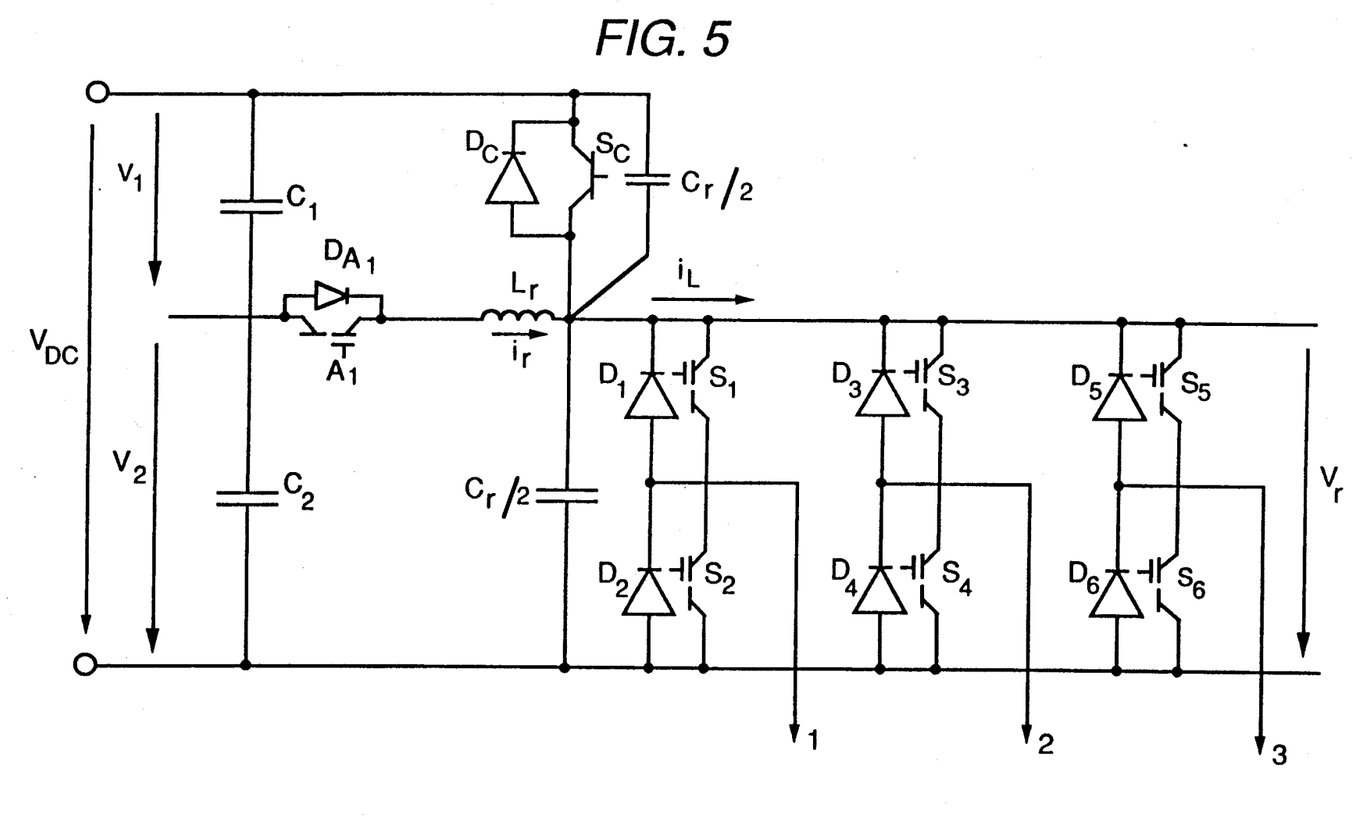
FIG. 5 is a schematic illustration of an alternative embodiment of an AQRDCL converter of the present invention.

An alternative embodiment of an AQRDCL converter according to the present invention is shown in FIG. 5. In the embodiment of FIG. 5, one of the auxiliary switches $A_2$ and its antiparallel diode $D_{A2}$ are eliminated. The resonant voltage and inductor current waveforms for the AQRDCL without auxiliary switch $A_2$ are similar to those of the AQRDCL with both auxiliary switches $A_1$ and $A_2$, as shown in FIG. 4. However, without auxiliary switch $A_2$, the resonant bus voltage $v_r$ resonates up to the level of the positive rail immediately upon current reversal in the resonant inductor $L_r$. Thus, eliminating auxiliary switch $A_2$ eliminates a delay in the resonant cycle. On the other hand, in the embodiment of FIG. 4, as described hereinabove, holding off auxiliary switch $A_2$ allows the quasi-resonant dc link voltage to remain at the negative dc rail voltage whenever the converter is in a freewheeling (zero) state, i.e., when all the upper and/or lower inverter switches are turned on simultaneously. Thus, auxiliary switch $A_2$ can be used to reduce the switching losses and conduction losses in the quasi-resonant circuit when multiple zero states are generated. However, the gains in efficiency achieved by using auxiliary switch $A_2$ are usually small, and the added control complexity is not justified in many applications.

Figure 6:
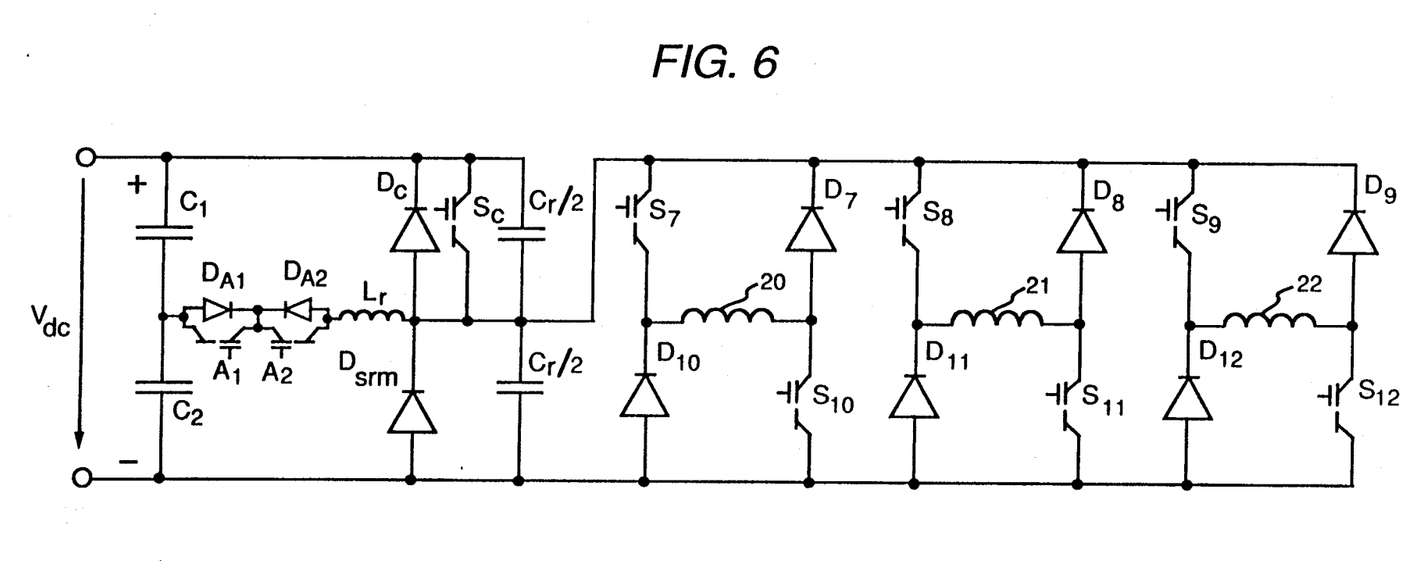
FIG. 6 is a schematic illustration of an AQRDCL-SRM inverter according to the present invention.

FIG. 6 illustrates the use of an AQRDCL converter to achieve soft-switching in a switched reluctance motor (SRM) bridge-type inverter. By way of example, the SRM inverter of FIG. 6 is illustrated as having three phases. In particular, the SRM inverter has three phase legs, each phase leg comprising an upper switching device $S_7$-$S_9$, respectively, and a lower switching device $S_{10}$-$S_{12}$, respectively, both connected in series with a phase winding 20-22, respectively. Each phase leg also has an upper flyback diode $D_7$-$D_9$, respectively, coupled in parallel with the series combination of the upper switching device and the respective phase winding and a lower flyback diode $D_{10}$-$D_{12}$, respectively, coupled in parallel with the series combination of the lower switching device and the respective phase winding.

Unlike the AQRDCL topology of FIG. 1 wherein the series combination of the antiparallel diodes $D_1$-$D_2$, $D_3$-$D_4$ and $D_5$-$D_6$, respectively, across the main switching devices of the inverter could be equivalently represented as diode $D_{eq}$ (FIG. 2) for clamping the resonant bus voltage $v_r$ to the negative rail during the resonant cycle, the AQRDCL-SRM converter requires an additional diode $D_{srm}$ to function as the second clamping means because the antiparallel diodes for each phase leg of the SRM inverter are not coupled in series across the resonant bus. With the addition of this diode $D_{srm}$, operation of the AQRDCL-SRM converter is the same as that of the AQRDCL converter of FIG. 1. That is, in the equivalent circuit of FIG. 2, diode $D_{srm}$ is substituted for diode $D_{eq}$, and the switching waveforms are identical to those of FIG. 3.

Although the SRM inverter does not provide resonant bus shorting capability (because each upper switch $S_7$-$S_9$, respectively, is not directly in series with the corresponding lower switch $S_{10}$-$S_{12}$, respectively; i.e., there is no bus shorting switch $S_{eq}$), the AQRDCL can resonate to the positive rail voltage when the voltage $V_1$ is lower than the voltage $V_2$. As long as this condition is satisfied, no additional bus shorting switch $S_{eq}$ is required in the AQRDCL-SRM converter topology.

Advantageously, the AQRDCL-SRM converter has quasi-PWM capability which allows the commutation instants of the SRM to be freely selected, thereby eliminating subharmonics and associated torque ripples that otherwise exist in a discrete pulse modulated ACRDCL converter.

Like the AQRDCL of FIG. 1, the AQRDCL-SRM converter is operable without one of the auxiliary switching devices $A_2$, if desired, in similar fashion as the AQRDCL converter of FIG. 5, as described hereinabove.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An auxiliary quasi-resonant dc link converter, comprising:
   an inverter having at least one phase, said inverter having at least one main switching device per phase;
   a resonant dc link circuit for generating a quasi-resonant voltage via a resonant bus to said inverter when coupled to a dc supply having positive and negative rails, said dc link circuit including a series combination of a resonant inductor and auxiliary switch means coupled to a resonant capacitance, said dc link circuit further including first and second capacitors coupled in series between said positive and negative rails of said dc supply, said first capacitor having a terminal coupled to said positive rail, and said second capacitor having a terminal coupled to said negative rail, the voltage across said second dc capacitor being controlled to be greater than the voltage across said first dc capacitor, said auxiliary switch means being activated to assist the resonant bus to resonate to and from the voltage level of said negative rail whenever the inverter switching devices change state;
   first clamping means for limiting the resonant bus voltage to the voltage level of said positive rail, said first clamping means comprising a clamp switching device coupled in antiparallel with a clamp diode; and
   second clamping means for clamping the resonant bus voltage of said negative rail during a resonant cycle.

2. The auxiliary quasi-resonant dc link converter of claim 1 wherein:
   said inverter includes two series-coupled main switching devices per phase, each said switching device having an anti-parallel diode coupled thereacross; and
   said second clamping means comprises the series combination of the anti-parallel diodes coupled across said main switching devices.

3. The auxiliary quasi-resonant dc link converter of claim 1 wherein:
   said inverter comprises a bridge inverter having a plurality of phase legs, each of said phase legs comprising an upper switching device and a lower switching device both connected in series with a phase winding, each of said phase legs further comprising an upper flyback diode coupled in parallel with the series combination of said upper switching device and said phase winding and a lower flyback diode coupled in parallel with the series combination of said lower switching device and said phase winding; and
   said second clamping means comprises a diode, the cathode of said diode being connected to said resonant bus and the anode of said diode being connected to said negative rail of said dc supply.

4. The auxiliary quasi-resonant dc link converter of claim 1 wherein said auxiliary switch means comprises a pair of antiparallel-coupled auxiliary switching devices, each of said auxiliary switching devices being coupled in antiparallel with an auxiliary diode, one of said auxiliary switching devices being turned on to assist the resonant bus to resonate to the voltage level of said negative rail whenever the inverter changes state, and the other one of said auxiliary switching devices being turned on to assist the resonant bus to resonate back up to the voltage level of said positive rail when the inverter state change is complete.

5. The auxiliary quasi-resonant dc link converter of claim 1 wherein:
   said auxiliary switch means comprises one auxiliary switching device coupled in antiparallel with an auxiliary diode.

6. A method for controlling a quasi-resonant dc link converter of the type having a resonant dc link circuit for generating a quasi-resonant voltage via a resonant bus to an inverter when coupled to a dc supply having positive and negative rails, said dc link circuit including a series combination of a resonant inductor and a pair of antiparallel-coupled auxiliary switching devices coupled to a resonant capacitance, said dc link circuit further including first and second dc capacitors coupled in series between said positive and negative rails of said dc supply, said first capacitor having a terminal coupled to said positive rail, and said second capacitor having a terminal coupled to said negative rail, the voltage across said second dc capacitor being controlled to be greater than the voltage across said first dc capacitor, said converter further including first clamping means for limiting the resonant bus voltage to the voltage level of said positive rail, said first clamping means comprising a clamp switching device coupled in antiparallel with a clamp diode, said converter further including second clamping means for clamping the resonant bus voltage to the voltage level of said negative rail during a resonant cycle, said method comprising the steps of:
- turning on said clamp switching device to provide a dc link current path;
- allowing the voltage level of said resonant bus to resonate to the voltage level of said negative rail;
- clamping said resonant bus to the voltage level of said negative rail using said second clamping means;
- turning on the respective inverter switching devices corresponding to a predetermined inverter state change;
- turning on the other one of said auxiliary switching devices after the inverter state change to allow the voltage level on said resonant bus to resonate to the voltage level of said positive rail;
- clamping said resonant bus to the voltage level of said positive rail by forward biasing said clamp diode;
- turning on said clamp switching device to provide a link current path as the current through said resonant inductor decreases; and
- turning off said other one of said auxiliary switching devices when the current through said resonant inductor is substantially zero.

7. The method of claim 6 wherein the step of allowing the voltage level of said resonant bus to resonate to the voltage level of said negative rail comprises turning on said one of said auxiliary switching devices before turning off said clamp switching device for relatively low negative and relatively low positive dc link currents.

8. The method of claim 6 wherein the step of allowing the voltage level of said resonant bus to resonate to the voltage level of said negative rail comprises turning on said one of said auxiliary switching devices after turning off said clamp switching device for relatively high positive dc link currents.

9. The method of claim 6 wherein the step of allowing the voltage level of said resonant bus to resonate to the voltage level of said negative rail comprises turning off said clamp switching device, with said one of said auxiliary switching devices remaining off, for high positive dc link currents above a high positive current threshold.

10. The method of claim 6 wherein the step of allowing the voltage level of said resonant bus to resonate to the voltage level of said negative rail comprises turning on said one of said auxiliary switching devices, with said clamp switching device remaining off, for relatively high negative dc link currents.

11. A method for controlling a quasi-resonant dc link converter of the type having a resonant dc link circuit for generating a quasi-resonant voltage via a resonant bus to an inverter when coupled to a dc supply having positive and negative rails, said dc link circuit including a series combination of a resonant inductor and an auxiliary switching device coupled to a resonant capacitance, said dc link circuit further including first and second dc capacitors coupled in series between said positive and negative rails of said dc supply, said first dc capacitor having a terminal coupled to said positive rail, and said second dc capacitor having a terminal coupled to said negative rail, the voltage across said second capacitor being controlled to be greater than the voltage across said first capacitor, said converter further including first clamping means for limiting the resonant bus voltage to the voltage level of said positive rail, said first clamping means comprising a clamp switching device coupled in antiparallel with a clamp diode, said converter further including second clamping means for clamping the resonant bus voltage to the voltage level of said negative rail during a resonant cycle, said method comprising the steps of:
- turning on said clamp switching device to provide a dc link current path;
- allowing the voltage level of said resonant bus to resonate to the voltage level of said negative rail;
- clamping said resonant bus to the voltage level of said negative rail using said second clamping means;
- turning on the respective inverter switching devices corresponding to a predetermined inverter state change;
- allowing the voltage level on said resonant bus to resonate to the voltage level of said positive rail after the inverter state change;
- clamping said resonant bus to the positive rail voltage by forward biasing said clamp diode;
- turning on said clamp switching device to provide a link current path as the current through said resonant inductor decreases.

12. The method of claim 11 wherein the step of allowing the voltage level of said resonant bus to resonate to the voltage level of said negative rail comprises turning on said auxiliary switching device before turning off said clamp switching device for relatively low negative and relatively low positive dc link currents.

13. The method of claim 11 wherein the step of allowing the voltage level of said resonant bus to resonate to the voltage level of said negative rail comprises turning on said auxiliary switching device after turning off said clamp switching device for relatively high positive dc link currents.

14. The method of claim 11 wherein the step of allowing the voltage level of said resonant bus to resonate to the voltage level of said negative rail comprises turning off said clamp switching device, with said auxiliary switching device remaining off, for high positive dc link currents above a high positive current threshold.

15. The method of claim 11 wherein the step of allowing the voltage level of said resonant bus to resonate to the voltage level of said negative rail comprises turning on said auxiliary switching device, with said clamp switching device remaining off, for relatively high negative dc link currents.

* * * * *